United States Patent
Boxwell et al.

(10) Patent No.: US 10,915,561 B2
(45) Date of Patent: Feb. 9, 2021

(54) IMPLEMENTING UNSTRUCTURED CONTENT UTILIZATION FROM STRUCTURED SOURCES IN SYSTEM FOR ANSWERING QUESTIONS

(71) Applicant: International Business Machines Corporation, Armonk, NY (US)

(72) Inventors: Stephen A. Boxwell, Franklin, OH (US); Keith Frost, Delaware, OH (US); Stanley J. Vernier, Grove City, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 16/258,957

(22) Filed: Jan. 28, 2019

(65) Prior Publication Data

US 2020/0242143 A1    Jul. 30, 2020

(51) Int. Cl.
*G06F 16/332*  (2019.01)
*G06F 16/22*   (2019.01)
*G06F 16/242*  (2019.01)
*G06F 40/284*  (2020.01)

(52) U.S. Cl.
CPC .......... *G06F 16/3329* (2019.01); *G06F 16/22* (2019.01); *G06F 16/243* (2019.01); *G06F 40/284* (2020.01)

(58) Field of Classification Search
CPC ....... G06F 16/243; G06F 16/22; G06F 40/284
USPC ........................................................ 707/736
See application file for complete search history.

(56) References Cited

U.S. PATENT DOCUMENTS

| | | |
|---|---|---|
| 7,792,814 B2 | 9/2010 | Cohen |
| 9,098,484 B2 | 8/2015 | Viry |
| 9,798,800 B2 * | 10/2017 | Duboue ............... G06F 16/334 |
| 10,025,849 B2 | 7/2018 | Kim et al. |
| 10,303,798 B2 | 5/2019 | Stubley et al. |

(Continued)

OTHER PUBLICATIONS

Kalyanpur et al., Structured data and inference in DeepQA, IBM Journal of Research and Development 56(3.4), pp.10:1-10:14 May, 2018.

(Continued)

*Primary Examiner* — Dung K Chau
(74) *Attorney, Agent, or Firm* — Mark Bergner

(57) ABSTRACT

A method, system and computer program product are provided for implementing unstructured content utilization from a structured source in a system capable of answering questions. A question is received by the system. The question is provided as a list of tokens T (T1, T2, . . . , Tn). A structured source is received containing records R (R1, R2, . . . , Rk). Headers H (H1, H2, . . . , Hi) are mapped to records. Each record R1, R2, . . . , Rk is searched for any token Ti in the list of tokens T (T1, T2, . . . , Tn) in the question. Responsive to identifying the token Ti in the question in a record Rj, the token Ti is added to a tracking structure. Any header mapped to the record Rj is compared to the list of tokens T (T1, T2, . . . , Tn) in the question. Responsive to identifying a header Hj mapped to the record Rj in the question, the header Hj is added to tracking structure. The tracking structure is sorted according a token order found in the question and ordered entries from the tracking structure are returned as an answer to the question.

19 Claims, 5 Drawing Sheets

(56) References Cited

U.S. PATENT DOCUMENTS

| | | | |
|---|---|---|---|
| 2005/0154692 A1* | 7/2005 | Jacobsen | G06F 40/151 |
| | | | 706/47 |
| 2008/0120129 A1* | 5/2008 | Seubert | G06Q 10/10 |
| | | | 705/35 |
| 2012/0331003 A1 | 12/2012 | Chu-Carroll et al. | |
| 2015/0100470 A1 | 4/2015 | Breef et al. | |
| 2016/0179784 A1 | 6/2016 | Clark et al. | |
| 2017/0116250 A1* | 4/2017 | Allen | G06N 5/04 |
| 2018/0081628 A1* | 3/2018 | Bajekal | G06F 16/9535 |
| 2019/0042988 A1* | 2/2019 | Brown | G06Q 10/0631 |
| 2019/0340240 A1 | 11/2019 | Duta | |

OTHER PUBLICATIONS

Sharma et al., Topic oriented semantic parsing, Proceeding of the 2015 IEEE 9th International Conference on Semantic Computing, Anaheim, CA, 2015 pp. 159-164, Feb. 7-9, 2015.

* cited by examiner

IMPLEMENTING UNSTRUCTURED CONTENT UTILIZATION FROM STRUCTURED SOURCES IN SYSTEM FOR ANSWERING QUESTIONS

FIELD OF THE INVENTION

The present invention relates generally to the data processing field, and more particularly, relates to a method, system and computer program product for implementing unstructured content utilization from a structured source in a system capable of answering questions.

DESCRIPTION OF THE RELATED ART

In a system capable of answering questions or Question Answer (QA) system, it is sometimes advantageous to make use of structured sources, such as database records or spreadsheets, for answering questions. For example, in the question "Who is the president of Cuba?", the correct answer might reasonably be inferred by consulting a table and interpreting its contents based on clues like other entities in the record or the header. Much work has been done on translating questions into database queries for candidate answer retrieval, but these tend to require extensive preparatory work or training data. Much work has also been done on translating structured sources into unstructured text, sometimes referred to as "table narration".

A need exists for a mechanism to efficiently and effectively implement unstructured content utilization from a structured source in a system capable of answering questions.

SUMMARY OF THE INVENTION

Principal aspects of the present invention are to provide a method, system and computer program product for implementing unstructured content utilization from a structured source in a system capable of answering questions. Other important aspects of the present invention are to provide such method, system and computer program product substantially without negative effects and that overcome many of the disadvantages of prior art arrangements.

In brief, a method, system and computer program product are provided for implementing unstructured content utilization from a structured source in a system capable of answering questions. A question is received by the system. The question is provided as a list of tokens T (T1, T2, . . . , Tn). A structured source is received containing records R (R1, R2, . . . , Rk). Headers H (H1, H2, . . . , Hi) are mapped to the records. Each record R1, R2, . . . , Rk is searched for any token Ti in the list of tokens T (T1, T2, . . . , Tn) in the question. Responsive to identifying the token Ti in the question in a record Rj, the token Ti is added to a tracking structure. Any header mapped to the record Rj is compared to the list of tokens T (T1, T2, . . . , Tn) in the question. Responsive to identifying a header Hj mapped to the record Rj in the question, the header Hj is added to tracking structure. The tracking structure is sorted according a token order found in the question and ordered entries from the tracking structure are returned as an answer to the question.

In accordance with features of the invention, the structured source is selected from a group consisting of a table, a spread sheet, a list, an array, and a set of database records.

In accordance with features of the invention, the list of tokens is populated to simulate a passage to compare to the question.

In accordance with features of the invention, an answer scoring model operates directly on records R (R1, R2, . . . , Rk).

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing unstructured content utilization from a structured source in a system capable of answering questions.

Figure 1:
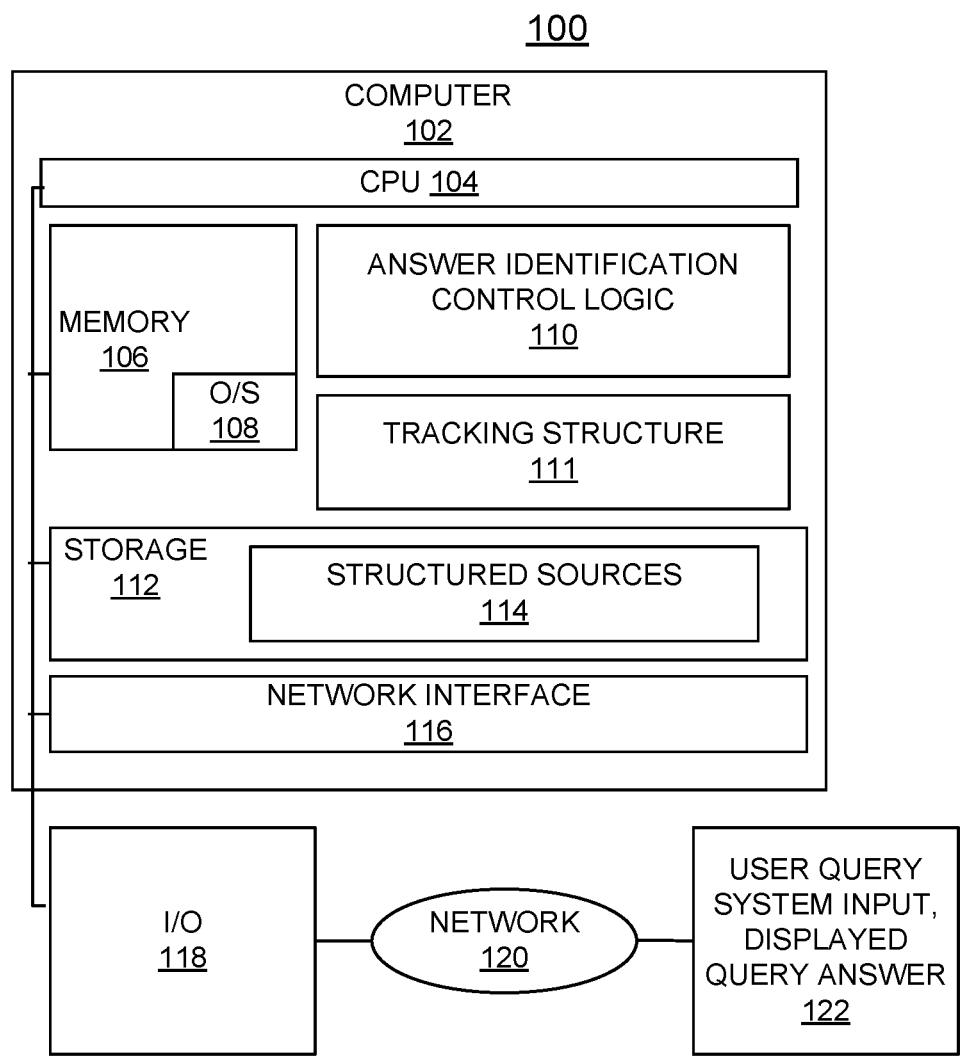
FIG. 1 provides a block diagram of an example computer system for implementing unstructured content utilization from a structured source in the system capable of answering questions in accordance with preferred embodiments.

Having reference now to the drawings, in FIG. 1, there is shown an example system embodying the present invention generally designated by the reference character 100 for implementing unstructured content utilization from a structured source in the system capable of answering questions in accordance with preferred embodiments. System 100 includes a computer system 102 including one or more processors 104 or general-purpose programmable central processing units (CPUs) 104. As shown, computer system 102 includes a single CPU 104; however, system 102 can include multiple processors 104 typical of relatively large systems.

Computer system 102 includes a system memory 106 including an operating system 108, an answer identification control logic 110 and a tracking structure 111 in accordance with preferred embodiments. System memory 106 is a random-access semiconductor memory for storing data, including programs. System memory 106 is comprised of, for example, a dynamic random-access memory (DRAM), a synchronous direct random-access memory (SDRAM), a current double data rate (DDRx) SDRAM, non-volatile memory, optical storage, and other storage devices.

Computer system 102 includes a storage 112 including structured sources 114 in accordance with preferred embodiments and a network interface 116. Structured sources 114 include, for example, a table, a spread sheet, a list, an array, and a set of database records. Computer system 102 includes an I/O interface 118 for transferring data to and from computer system components including CPU 104, memory 106 including the operating system 108, answer identification control logic 110, tracking structure 111, storage 112 including structured sources 114, and network interface 116, and a network 120 and a user query system input, and displayed query answer 122.

In accordance with features of the invention, the answer identification control logic 110 enables answer identification with tracking structure 111 and structured sources 114. The answer identification control logic 110 presents query answer information 122 to a user at the user query system input, and displayed query answer 122.

Figure 2A:
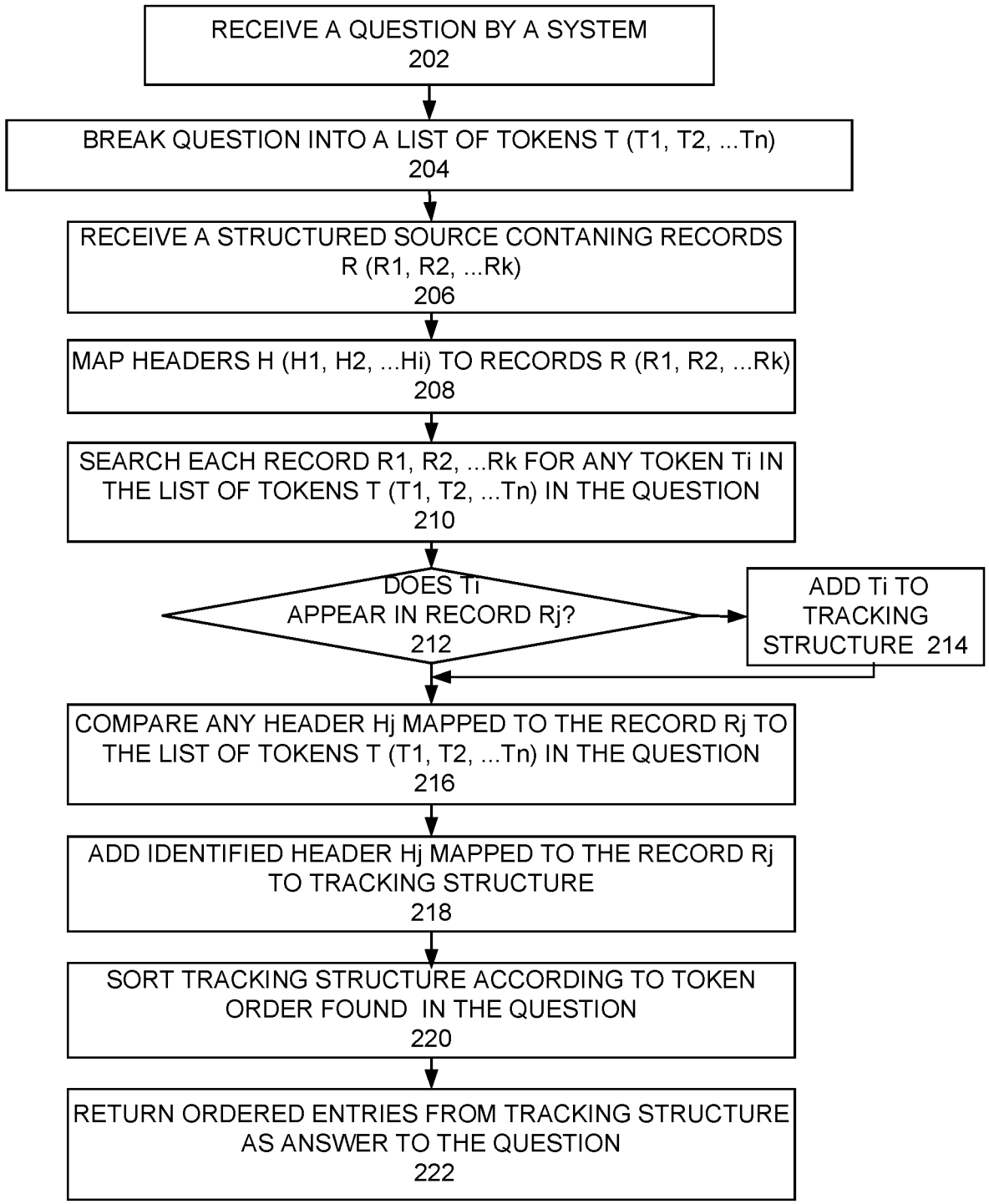
FIGS. 2A, 2B, and 3 are respective flow charts illustrating example system operations to implement unstructured content utilization from a structured source in the system capable of answering questions in accordance with preferred embodiments.
Figure 2B:
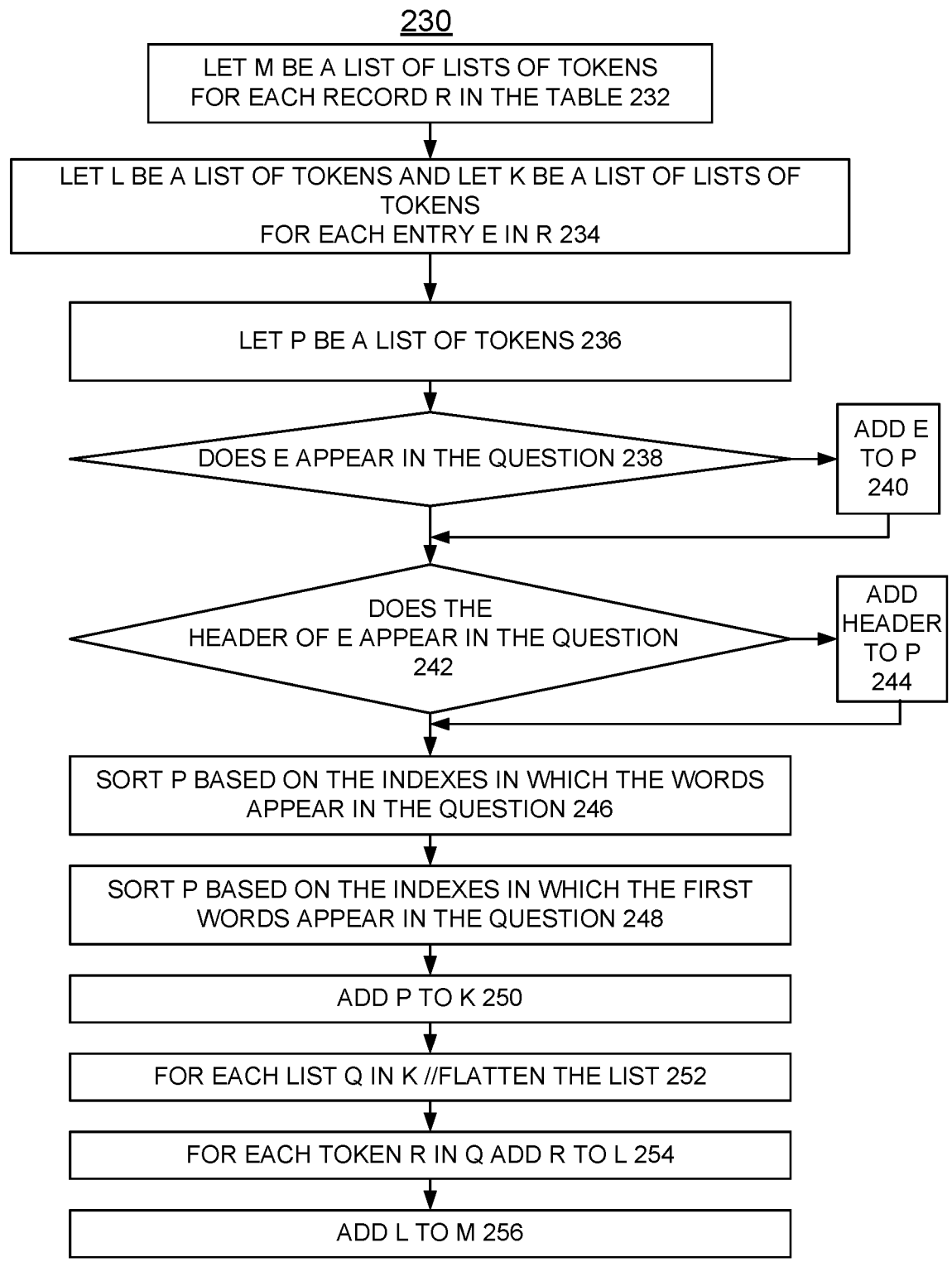
Figure 3:
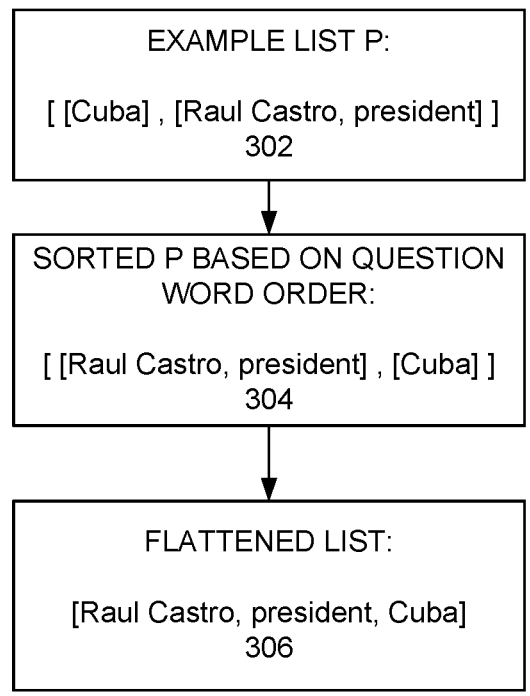

Referring to FIGS. 2A, 2B, and 3, there are shown respective example system operations generally designated by the reference characters 200, 230, and 300 of computer system 102 of FIG. 1, for implementing unstructured content utilization from a structured source in the system capable of answering questions in accordance with preferred embodiments.

Referring to FIG. 2A, system operations 200 to implement query answer identification start at a block 202 with receiving a question. As indicated at a block 204, the question is broken into a list of tokens T (T1, T2, ..., Tn). A structured source containing records R (R1, R2, ..., Rk) is received as indicated at a block 206. As indicated at a block 208, headers H (H1, H2, ..., Hi) are mapped to the records. As indicated at a block 208, each of the records R (R1, R2, ..., Rk) is searched for any token Ti in the list of tokens T (T1, T2, ..., Tn) in the question.

As indicated at a decision block 212, checking for any token Ti that appears in the record Rj is performed. Responsive to identifying the token Ti in the record Rj in the question, the token Ti is added to a tracking structure as indicated at a block 214. Any header mapped to the record Rj is compared to the list of tokens T (T1, T2, ..., Tn) in the question as indicated at a block 216.

Responsive to identifying a header Hj mapped to the record Rj in the question, the header Hj is added to tracking structure as indicated at a block 218. The tracking structure is sorted according a token order found in the question as indicated at a block 220. As indicated at a decision block 222, ordered entries from the tracking structure are returned as an answer to the question.

Referring to FIG. 2B, system operations 230 to implement query answer identification are provided, for example, considering the following question: "Who is the president of Cuba?" A search retrieves 25 unstructured documents, none of which contain information relevant to our question. Suppose further that a structured document, such as, a simple spreadsheet, is also returned:
country|capital|president
France|Paris|Emmanuel Macron
Cuba|Havana|Raul Castro
Russia|Moscow|Vladimir Putin
Now, the second record in this structured resource is relevant to the search question. A list of tokens is populated as follows, which will simulate the passage which the question will be compared. The list of tokens will be constructed thusly:

In FIG. 2B, as indicated at a block 232, let M be a list of lists of tokens and for each record R in the table: As indicated at a block 234, let L be a list of tokens, let K be a list of lists of tokens and for each entry E in R: Let P be a list of tokens as indicated at a block 236. As indicated at a decision block 238, checking if the entry E appears in the question is performed. When the entry E appears in the question, add entry E to P as indicated at a block 240. As indicated at a decision block 242, checking if the header of entry E appears in the question is performed. When the header of entry E appears in the question, add the header of entry E to P as indicated at a block 244.

As indicated at a block 246, sort P based on the indexes in which the words appear in the question. As indicated at a block 248, sort P based on the indexes in which the first words appear in the question. As indicated at a block 250, add the list of tokens P to the list of lists of tokens K. As indicated at a block 252, for each list Q in the list of lists of tokens K, the list is flattened. As indicated at a block 254, for each token R in Q, R is added to the list of tokens L. As indicated at a block 256, the list of tokens L is added to list of lists of tokens M.

Referring to FIG. 3, system operations 300 to implement query answer identification are provided. For example, consider the question "Who is the president of Cuba?". For the first record R, an empty list L is produced, because there are no tokens in common. For the second record, however, we will generate a nonempty list L. For entry E=cuba, "cuba" is added to P, but not "country". For entry E="havana", nothing is added to P. For entry E="Raul Castro", then entities "Raul Castro" and "president" are added to P, in that order. Now the list P itself looks like the example list P,
[[Cuba], [Raul Castro, president]] as indicated at a block 302. As indicated at a block 304, P is then sorted based on question word order, into:
[[Raul Castro, president], [Cuba]]. As indicated at a block 306, the list is then flattened into:
[Raul Castro, president, Cuba]. For example, consider the question: "What country is Raul Castro the president of?" would produce "Cuba, Raul Castro, president".

Figure 4:
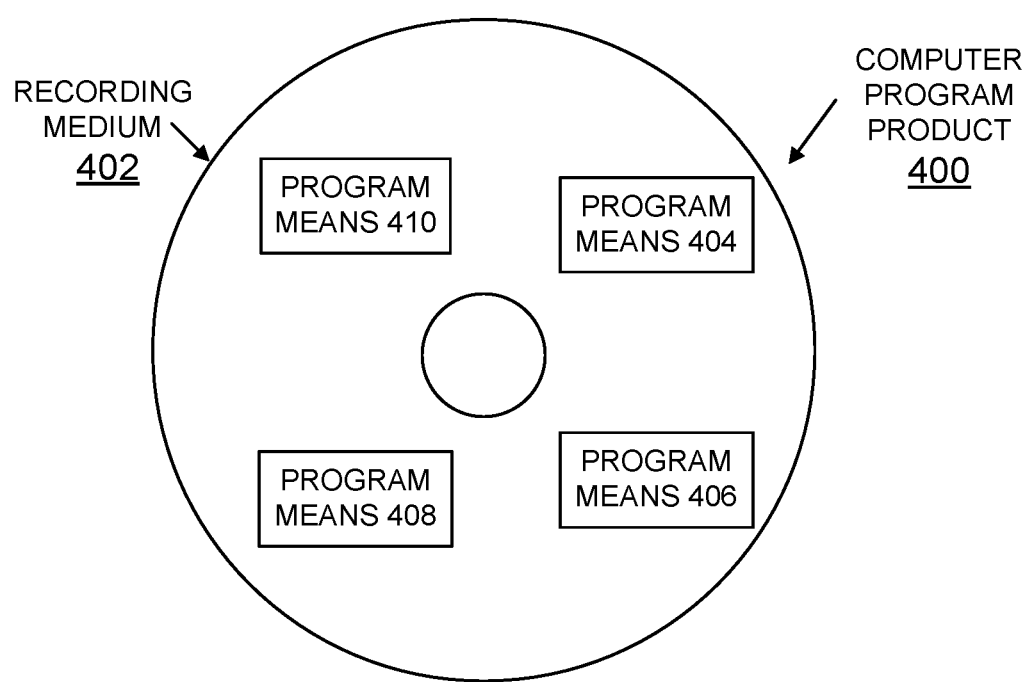
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. The computer readable storage medium 402, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 402 stores program means or instructions 404, 406, 408, and 410 on the non-transitory computer readable storage medium 402 for carrying out the methods for utilizing unstructured content from a structured source in a system capable of answering questions, such as the system 100 of FIG. 1.

Computer readable program instructions 404, 406, 408, and 410 described herein can be downloaded to respective computing/processing devices from a computer readable storage medium or to an external computer or external storage device via a network, for example, the Internet, a local area network, a wide area network and/or a wireless network. The computer program product 400 may include cloud-based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 404, 406, 408, and 410 from the network and forwards the computer readable program instructions for storage in a computer readable storage medium within the respective computing/processing device.

A sequence of program instructions or a logical assembly of one or more interrelated modules defined by the recorded program means 404, 406, 408, and 410, direct the system 100 for implementing question answer identification of the preferred embodiment.

While the present invention has been described with reference to the details of the embodiments of the invention shown in the drawing, these details are not intended to limit the scope of the invention as claimed in the appended claims.

What is claimed is:

1. A system for implementing unstructured content utilization from a structured source in the system capable of answering questions comprising:
   an answer identification control logic;
   said answer identification control logic and a tracking structure tangibly embodied in a non-transitory machine readable medium used to implement question answering utilizing unstructured content from a structured source;
   said answer identification control logic, receiving a question and breaking the question into a list of tokens;
   said answer identification control logic, receiving a structured source containing records, and mapping headers to records;
   said answer identification control logic, searching each record for any token in the list of tokens in the question, responsive to identifying the token in the question in a record, adding the token to a tracking structure, and comparing any header mapped to the record to the list of tokens in the question, and responsive to identifying a header mapped to the record in the question, adding the header to tracking structure;
   said answer identification control logic, sorting the tracking structure according a token order found in the question, and returning ordered entries from the tracking structure as an answer to the question.

2. The system as recited in claim 1, wherein the structured source is selected from a group consisting of a table, a spread sheet, a list, an array, and a set of database records.

3. The system as recited in claim 2, wherein said answer identification control logic, receiving a structured source containing records, and mapping headers to records further includes said answer identification control logic, receiving unstructured free text documents together with receiving one or more structured source containing records.

4. The system as recited in claim 1, wherein said answer identification control logic, receiving a question and breaking the question into a list of tokens includes receiving an unstructured free text question from a querying user.

5. The system as recited in claim 1, wherein said answer identification control logic, receiving a question and breaking the question into a list of tokens includes said answer identification control logic, sorting the tracking structure according a token order found in the question, and returning ordered entries from the tracking structure as an answer to the question includes said answer identification control logic, sending and displaying a query answer to the user.

6. The system as recited in claim 1, wherein said answer identification control logic, sorting the tracking structure according a token order found in the question, includes said answer identification control logic, sorting a list of tokens based on indexes in which words appear in the question.

7. The system as recited in claim 6, wherein said answer identification control logic, sorting a list of tokens based on indexes in which first words appear in the question.

8. The system as recited in claim 7, includes said answer identification control logic, includes said answer identification control logic, for each list in a list of lists of tokens, flattening the list.

9. A method for implementing unstructured content utilization from a structured source in a system capable of answering questions comprising:
   providing an answer identification control logic;
   said answer identification control logic and a tracking structure tangibly embodied in a non-transitory machine readable medium used to implement question answering utilizing unstructured content from a structured source; comprising:
   receiving a question and breaking the question into a list of tokens;
   receiving a structured source containing records, and mapping headers to records;
   searching each record for any token in the list of tokens in the question, responsive to identifying the token in the question in a record,
       adding the token to a tracking structure,
       comparing any header mapped to the record to the list of tokens in the question, and
       responsive to identifying a header mapped to the record in the question, adding the header to tracking structure;
   sorting the tracking structure according a token order found in the question, and
   returning ordered entries from the tracking structure as an answer to the question.

10. The method as recited in claim 9, wherein receiving a structured source containing records includes receiving a structured source selected from a group consisting of a table, a spread sheet, a list, an array, and a set of database records.

11. The method as recited in claim 9, wherein receiving a question and breaking the question into a list of tokens includes receiving an unstructured free text question from a querying user.

12. The method as recited in claim 9, wherein receiving a question and breaking the question into a list of tokens includes sorting a tracking structure according indexes in which words appear in the question.

13. The method as recited in claim 12, includes sorting the tracking structure according indexes in which first words appear in the question.

14. The method as recited in claim 13, includes for each list in a list of lists of tokens, flattening the list.

15. The method as recited in claim 9, wherein returning ordered entries from the tracking structure as an answer to the question includes sending and displaying a query answer to the user.

16. A computer program product for implementing unstructured content utilization from a structured source in a system capable of answering questions, the computer program product embodied in a non-transitory machine readable medium used to implement question answering utilizing unstructured content from a structured source, comprising:
receiving a question and breaking the question into a list of tokens;
receiving a structured source containing records, and mapping headers to records;
searching each record for any token in the list of tokens in the question, responsive to identifying the token in the question in a record,
adding the token to a tracking structure,
comparing any header mapped to the record to the list of tokens in the question, and
responsive to identifying a header mapped to the record in the question, adding the header to tracking structure;
sorting the tracking structure according a token order found in the question, and
returning ordered entries from the tracking structure as an answer to the question.

17. The computer program product as recited in claim 16, wherein receiving a structured source containing records includes receiving a structured source selected from a group consisting of a table, a spread sheet, a list, an array, and a set of database records.

18. The computer program product as recited in claim 16, wherein receiving a question and breaking the question into a list of tokens includes receiving an unstructured free text question from a querying user.

19. The computer program product as recited in claim 16, wherein returning ordered entries from the tracking structure as an answer to the question includes sending and displaying a query answer to the user.

* * * * *